(12) United States Patent
Von Liechtenstein et al.

(10) Patent No.: US 9,950,861 B2
(45) Date of Patent: Apr. 24, 2018

(54) UNIT AND PROCEDURE FOR AUTOMATED TRANSFER OF BOX ELEMENTS

(71) Applicant: PHARMATHEK S.r.L., Verona (IT)

(72) Inventors: Alexander Von Liechtenstein, Triesenberg (LI); Luigi Zecchetto, Minerbe (IT)

(73) Assignee: PHARMATHEK S.r.L., Verona (IT)

( * ) Notice: Subject to any disclaimer, the term of this patent is extended or adjusted under 35 U.S.C. 154(b) by 0 days.

(21) Appl. No.: 14/514,588

(22) Filed: Oct. 15, 2014

(65) Prior Publication Data
US 2015/0104278 A1    Apr. 16, 2015

(30) Foreign Application Priority Data

Oct. 15, 2013   (EP) .................................. 13188624

(51) Int. Cl.
*B65G 1/04*    (2006.01)

(52) U.S. Cl.
CPC ......... *B65G 1/0407* (2013.01); *B65G 1/0435* (2013.01)

(58) Field of Classification Search
CPC .............................. B65G 1/0407; B65G 1/0435
See application file for complete search history.

(56) References Cited

U.S. PATENT DOCUMENTS

| | | | | |
|---|---|---|---|---|
| 2,709,015 A | * | 5/1955 | Sasgen ................... | B66F 9/183 187/231 |
| 2,727,779 A | * | 12/1955 | Phillips ................... | B66F 9/183 294/119.1 |
| 2,739,009 A | * | 3/1956 | Phillips ................... | B66F 9/183 294/119.1 |
| 6,824,345 B2 | * | 11/2004 | Hansl ................... | B65G 1/0407 198/347.2 |
| 2006/0285947 A1 | * | 12/2006 | Hansl ................... | B65G 1/0407 414/277 |

(Continued)

FOREIGN PATENT DOCUMENTS

| | | |
|---|---|---|
| DE | 195 09 951 A1 | 9/1996 |
| DE | 10 2008 003 157 A1 | 9/2009 |

(Continued)

OTHER PUBLICATIONS

European Search Report for European Application No. EP 13 18 8624, two pages, dated Feb. 26, 2014.

*Primary Examiner* — Kaitlin S Joerger
(74) *Attorney, Agent, or Firm* — Vorys, Sater, Seymour & Pease LLP

(57) ABSTRACT

Provided is an automated transfer unit of box-shaped elements corresponding with at least one storage surface, including clamping bars positioned alongside and distanced from each other so as to contain a plurality of box-shaped elements aligned with each other, and control and guide means configured to move the clamping bars to engage and translate the aligned box-shaped elements as a unit. Further provided is a procedure for placing box-shaped elements arranged in rows on a storage surface; translating as a unit onto a work surface at least a portion of a row including a plurality of box-shaped elements; selecting and separating on the work surface at least one box-shaped element and sending it for delivery; and repositioning any residual box-shaped elements.

6 Claims, 4 Drawing Sheets

(56) References Cited

U.S. PATENT DOCUMENTS

| | | | |
|---|---|---|---|
| 2007/0144991 A1* | 6/2007 | Hansl | B65G 1/0407 211/121 |
| 2009/0136331 A1* | 5/2009 | Muser | B65G 1/0407 414/529 |
| 2011/0008138 A1* | 1/2011 | Yamashita | B65G 1/0492 414/277 |
| 2013/0167478 A1 | 7/2013 | Smits | |
| 2014/0205423 A1* | 7/2014 | Yamashita | B65G 1/1378 414/807 |
| 2015/0259141 A1* | 9/2015 | Yamada | B65G 1/0407 414/267 |

FOREIGN PATENT DOCUMENTS

| | | | | |
|---|---|---|---|---|
| FR | 2881935 A1 * | 8/2006 | | B65G 1/0435 |
| GB | 2 306 450 A | 5/1997 | | |
| WO | WO 03018443 A1 * | 3/2003 | | B65G 1/0435 |
| WO | WO 2005110894 A1 * | 11/2005 | | B65G 1/02 |
| WO | 2011/158422 A1 | 12/2011 | | |

* cited by examiner

UNIT AND PROCEDURE FOR AUTOMATED TRANSFER OF BOX ELEMENTS

FIELD OF THE INVENTION

The present invention relates to a unit and procedure for automated transfer of box shaped elements or the like in correspondence with at least one storage surface of a shelving system where the box-shaped elements are stored in several rows, of the type suitable to selectively transfer the box-shaped elements to alternately perform extraction and storage steps of the box-shaped elements.

In particular, it relates to a unit and a procedure for the automated insertion and unloading of box-shaped elements or the like, onto and from the shelves of a shelving unit where said elements are densely stored in several rows.

DESCRIPTION OF THE PRIOR ART

As known, automated systems for transferring objects of relatively limited size and weight, for example weighing less than 2 kg, exist on the market.

The prior systems permit the storage and automated retrieval of the objects on shelving fitted with open shelves and entail various advantages.

For example, they allow for very wide shelving to be provided, the space for an operator to move around not being necessary, they have an acceptable speed of movement, require and permit reduced use of personnel.

In such systems, the automated storage method provides for various steps. Initially the items to be inserted, for example various packages, are identified and catalogued, for example by scanning a dedicated barcode or the like. The dimensions of the item are then processed by a special electronic processor which also determines the best position for said object on the shelving unit, based on the available space.

Subsequently the item is inserted in a transfer unit terminal which transports it to the position identified on the shelving and deposits it therein.

Extraction of the same from the shelving may then be required.

In such case said item must be retrieved by means of the electronic processor, which has memorised the position of the item.

The transfer unit is then guided in correspondence with the item to be collected, collects it and transfers it to a position which can be reached by the user.

Such a device is described, for example, in patent application DE-A-19509951. As well as said advantages, the prior art described has several drawbacks.

In particular, the prior transfer units are generally complex and expensive, having to perform various loading and unloading operations from the shelves.

A further drawback is the fact that some of the prior units are generally only able to transport a single item at a time with a consequent relative slowness of the loading and unloading operations. Other units are able to transport a plurality of elements but are in any case slow and complex.

Such drawback is relevant during the unloading step, when the items need to be delivered quickly.

It should also be noted that said drawbacks become increasingly significant as the number and variety of box-shaped elements and the like to be handled increases as a result of the increasing variety of articles available to consumers.

In this situation the technical purpose of the present invention is to develop a particularly advantageous unit and procedure substantially able to overcome the drawback mentioned above.

Within the sphere of said technical purpose one important aim of the invention is to develop a terminal unit and transfer procedure which is easy to produce and implement, thus able to offer maximum functioning reliability and be produced at reduced costs.

Another important aim of the invention is to devise a unit and procedure able to exploit the space available on the shelves of a shelving unit in an optimal manner. A further aim of the invention is to devise a unit and procedure which is able to simultaneously move several box-shaped elements or the like to permit maximum rapidity of insertion and unloading of the box-shaped elements.

SUMMARY OF THE INVENTION

Said technical purpose and specified aims are achieved by a unit comprising clamping bars positioned alongside and distanced from each other so as to flank simultaneously a plurality of the box-shaped elements aligned with each other, and control and guide means suitable to move said clamping bars to engage and translate the aligned box-shaped elements; a work surface positioned under the clamping bars and positionable at the level of and consecutively with one the storage surface, the clamping bars being suitable to translate by sliding the box-shaped elements onto the work surface and wherein the work surface is movable so as to separate by falling, one or more of the box-shaped elements positioned thereon.

BRIEF DESCRIPTION OF THE DRAWINGS

The characteristics and advantages of the invention are clearly evident from the following detailed description of a preferred embodiment thereof, with reference to the accompanying drawings, in which.

DESCRIPTION OF THE PREFERRED EMBODIMENTS

Figure 1:
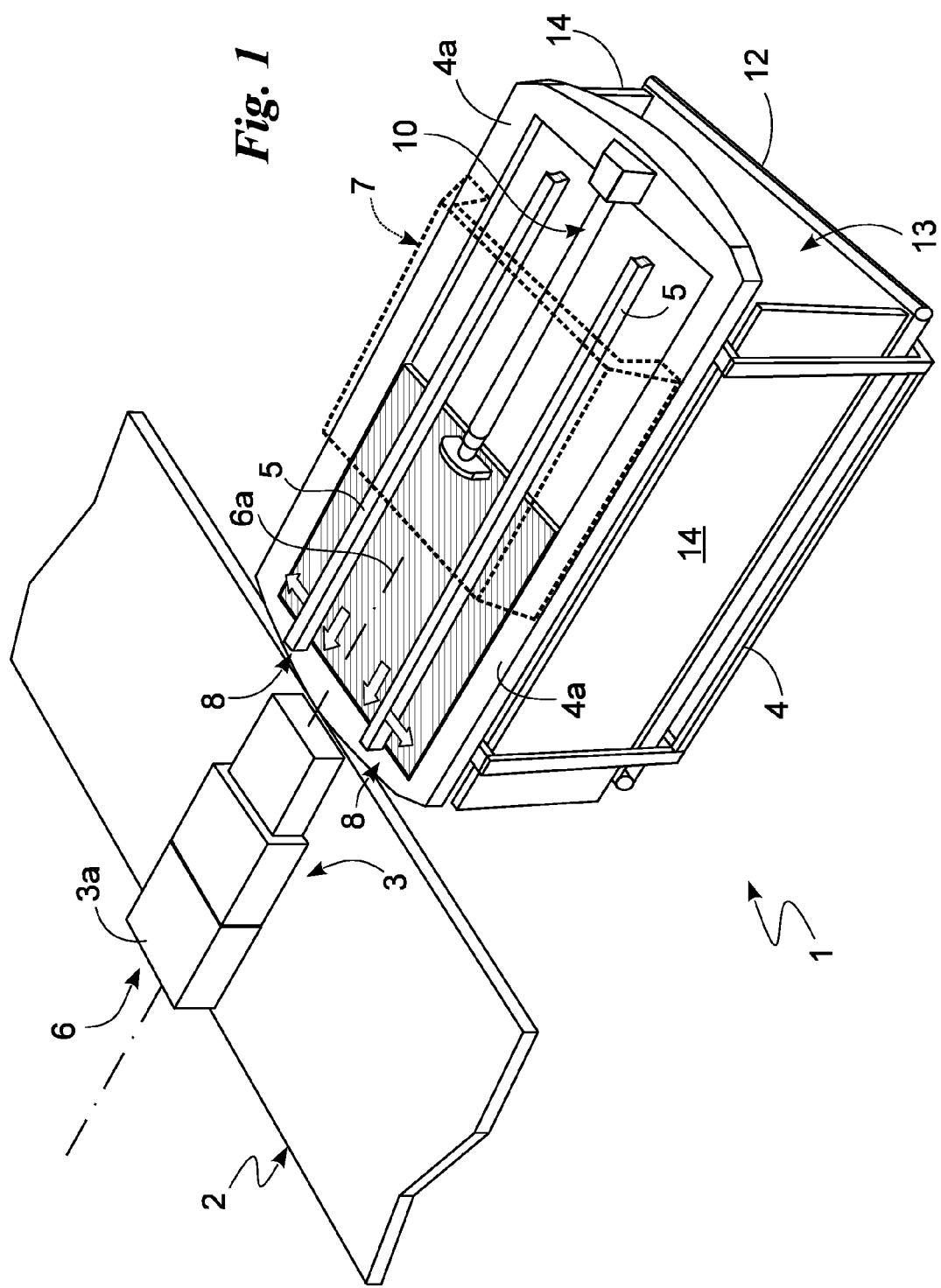
FIG. 1 shows all together and in a schematic manner the automated transfer unit according to the invention, placed next to a storage surface supporting a row of box-shaped elements.
Figure 2:
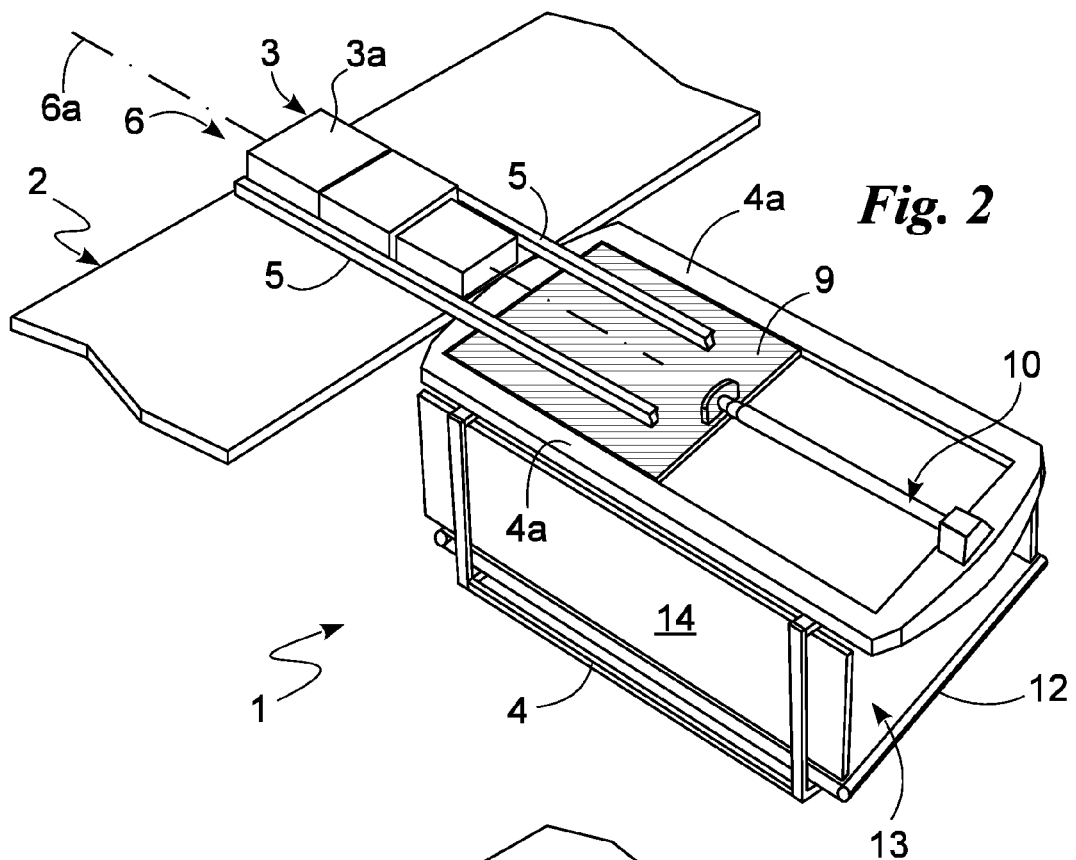
FIG. 2 shows in a schematic manner the beginning of a collection step of a row of box-shaped elements from said unit.
Figure 3:
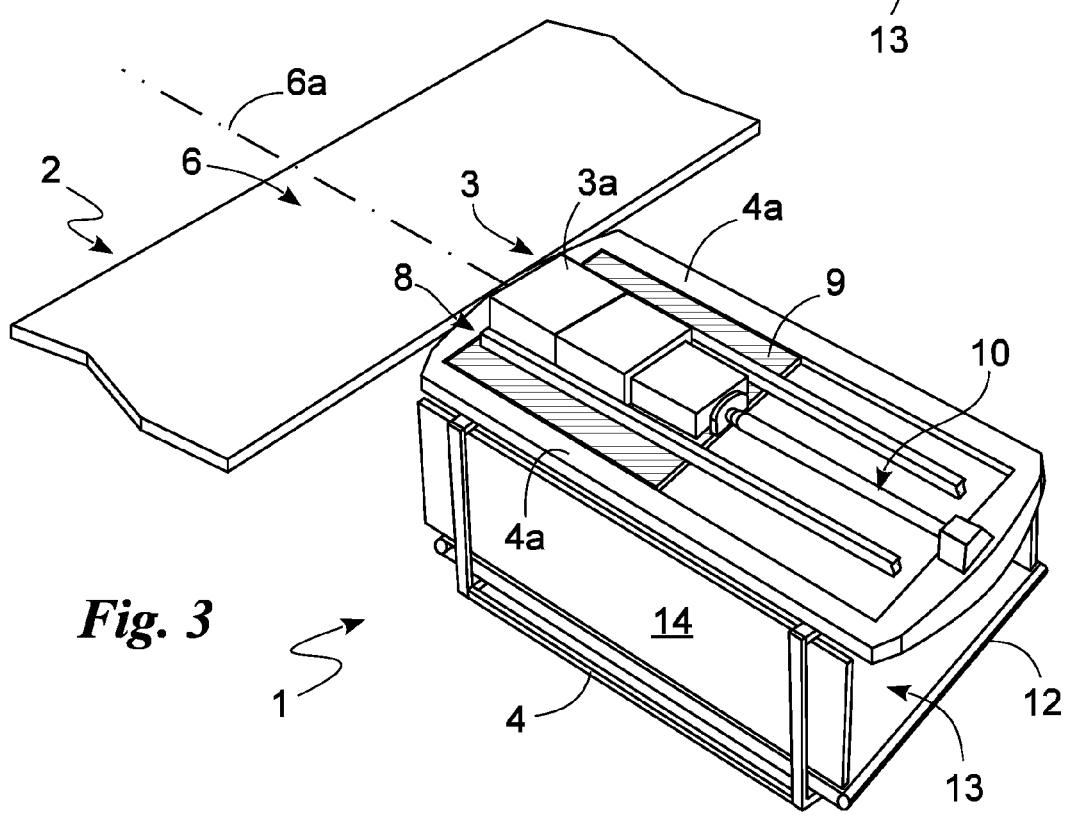
FIG. 3 shows how the collection step continues subsequent to FIG. 2.
Figure 4:
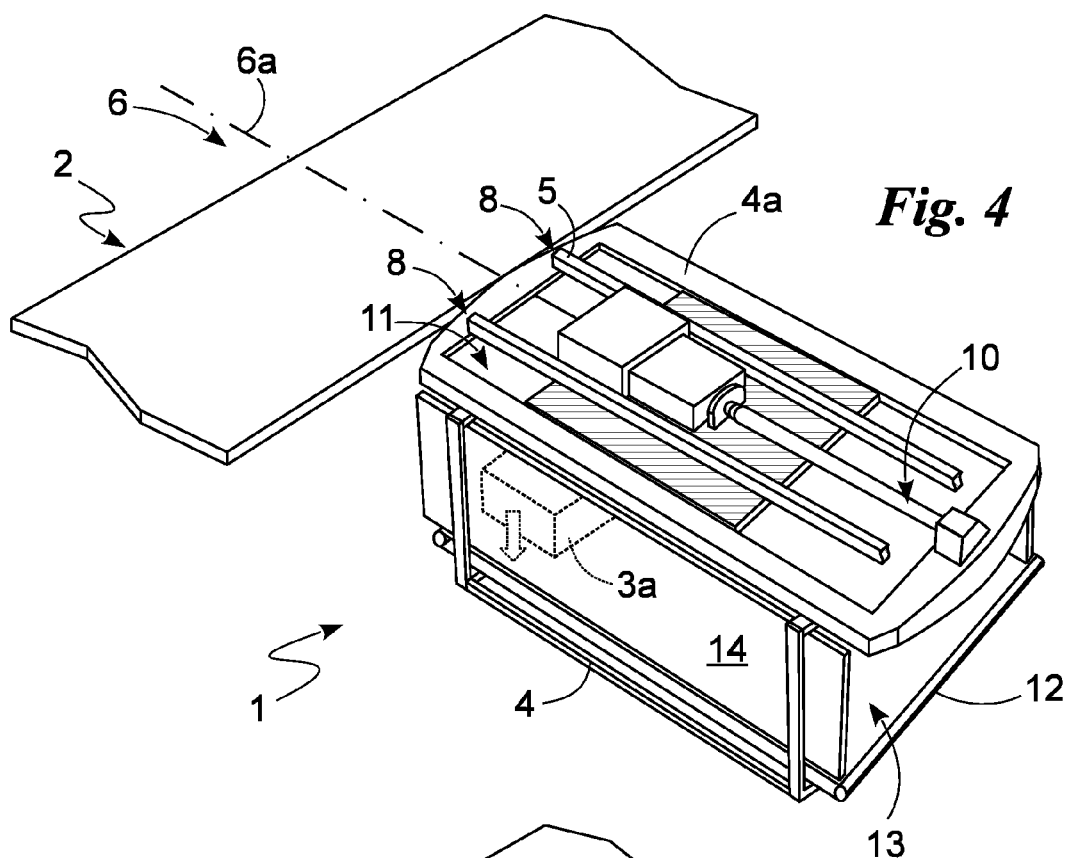
FIG. 4 shows how the selection of a single box-shaped element from those composing the row collected from the storage surface, takes place.
Figure 5:
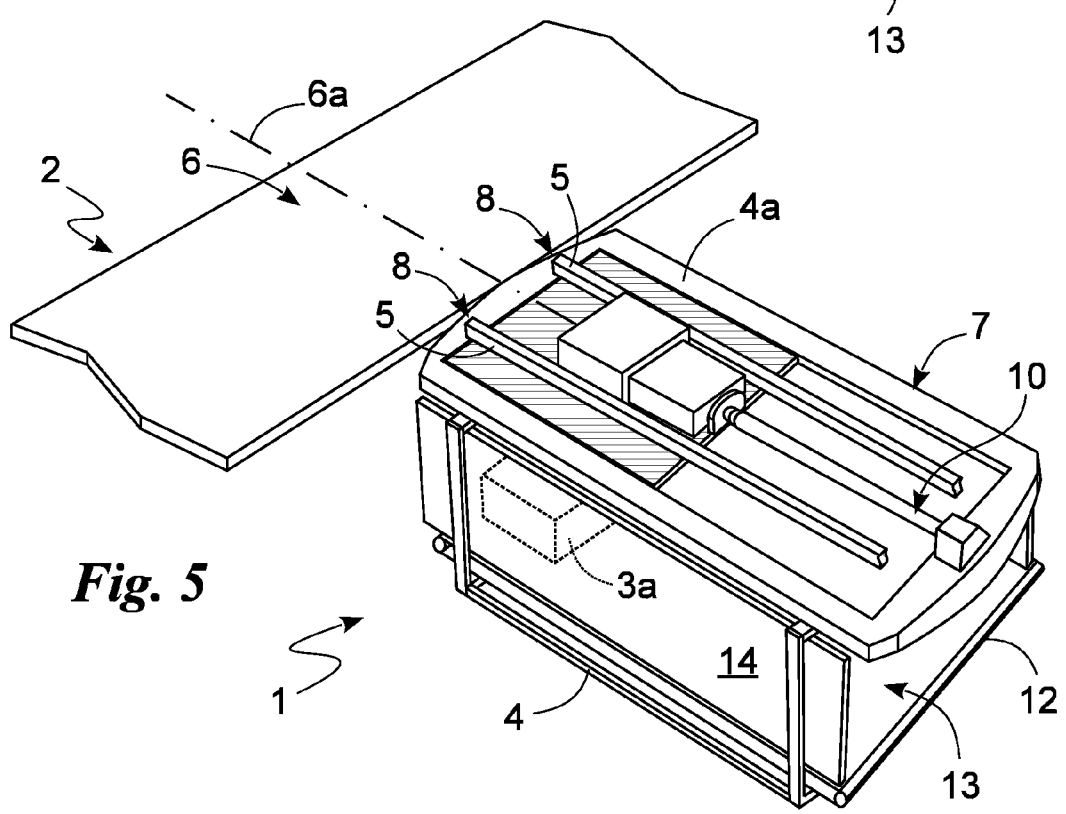
FIG. 5 shows the beginning of a repositioning or storage step of box-shaped elements not selected in said row.
Figure 6:
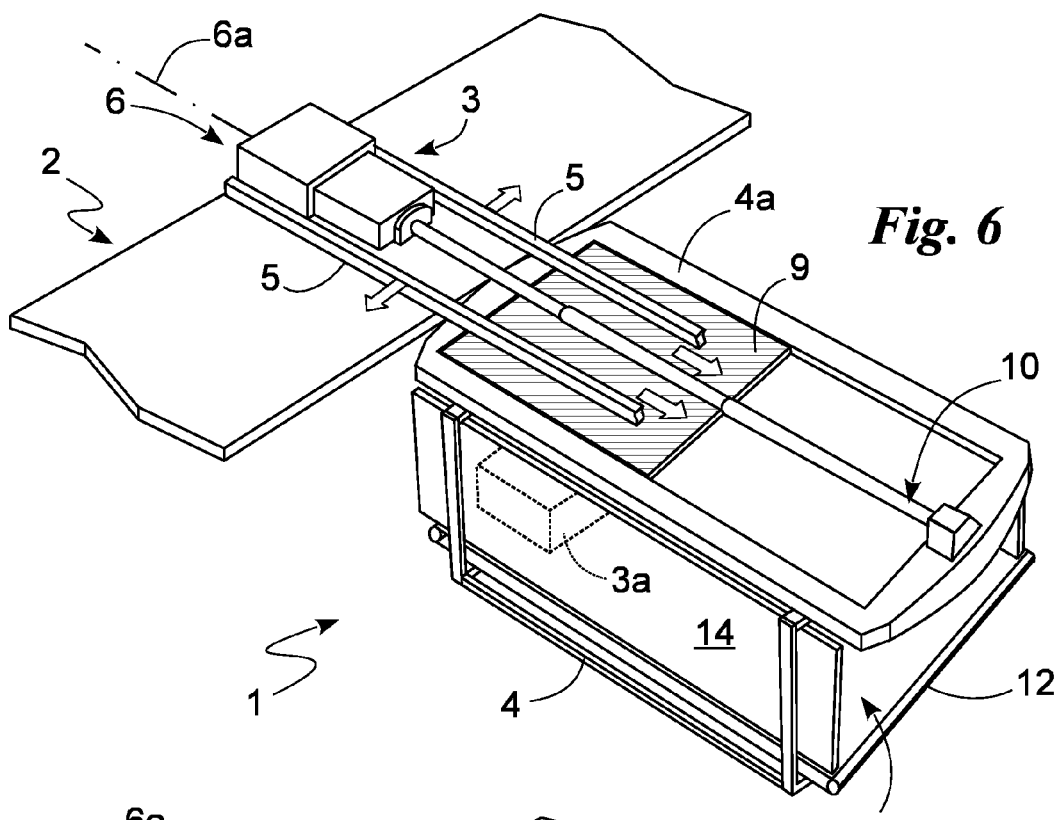
FIG. 6 shows a terminal phase of the repositioning step.
Figure 7:
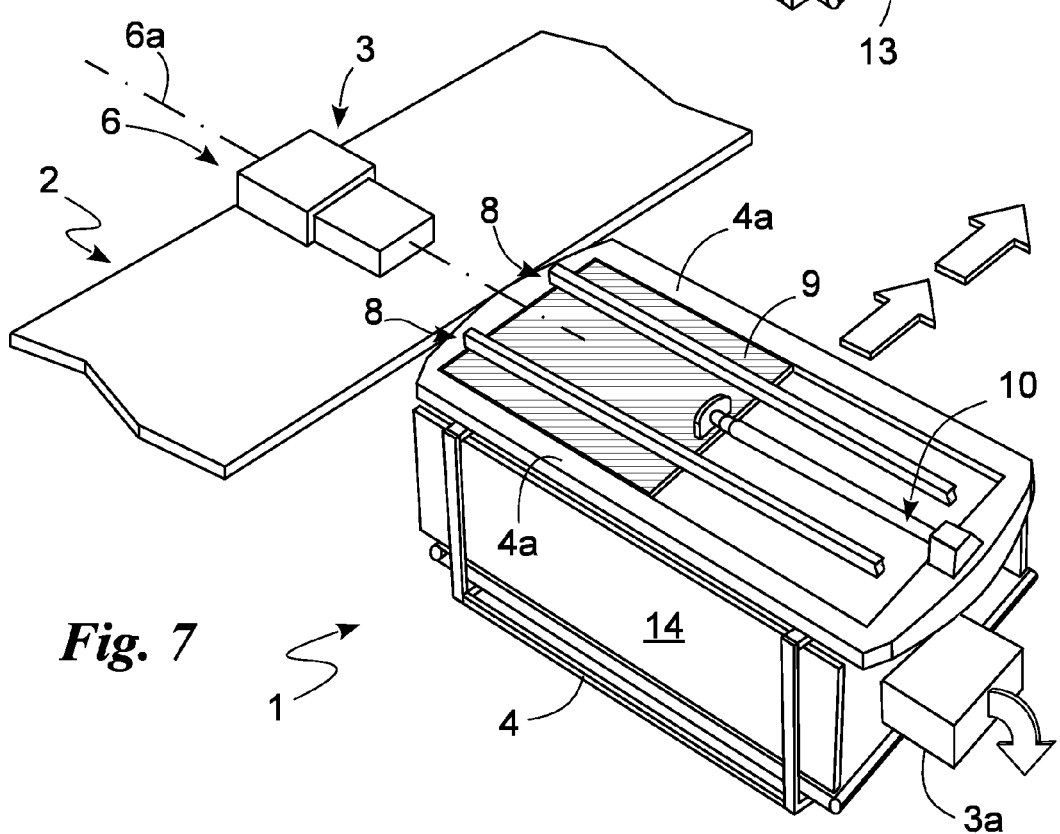
FIG. 7 shows how the box-shaped element selected can be unloaded towards the user requesting it.

With reference to said drawings, reference numeral 1 globally denotes the automated transfer unit of box-shaped elements or the like according to the invention. It presents itself as the end and functionally determinant part of a shelving system. The system which the unit 1 is inserted in comprises one or more storage surfaces 2 suitable to support box-shaped elements 3 or the like of a relatively small weight and dimension, stored while awaiting pick-up and stored in a plurality of rows.

The storage surfaces 2 defines preferably a plane, preferably horizontal, and the plane has a longitudinal direction, which is the main extension direction, and a transversal direction, perpendicular to longitudinal direction.

In practice the box-shaped elements 3 or the like are generally parallelepiped packages of various products and articles.

The system is designed to be operative to the benefit of shopping centres, distribution centres handling a large number of products and articles and a great variety thereof and which therefore require large storage areas and a fast automated delivery of the articles.

The system comprises a base apparatus—in itself known—suitable to translate the unit 1 in correspondence with the storage surface 2. For example, the base apparatus may comprise column-shaped elements extending above trolleys placed on the ground or floor and fitted with couplings or guides on the shelving units, to translate the unit 1 horizontally. To translate the unit 1 vertically, said apparatus may be connected to pneumatic or electric lifting means, inserted in correspondence with the column-shaped elements.

One shelving system is for example indicated in the patent EP 2113437 in the Applicant's name.

The transfer unit 1 according to the invention is suitable to engage and transfer a plurality of box-shaped elements 3 to alternately perform a collection or extraction step and a storage step.

It presents a frame 4 fitted with a broad and rigid upper board 4a substantially made as a ring-shaped plate.

Above the frame 4, clamping bars 5 are positioned, preferably two in number and placed alongside each other suitable to flank or contain or delimit on opposite sides a plurality of box-shaped elements 3 positioned aligned with each other and substantially defining a row 6.

The row 6 has a main direction of extension 6a and the clamping bars 5 have the same main direction of extension 6a. The same direction of extension 6a is preferably the transverse direction of the storage surface 2 supporting the row 6. Preferably, each row 6 has homogeneous or equal box-shaped elements 3 and in the case of box-shaped elements which are different from each other, those which occupy more space are preferably placed at the maximum distance from the unit 1.

Control and guide means engaging and supporting the clamping bars 5 and suitable to move them both parallel and transversally to the direction of extension 5a are provided.

To insert said control and guide means advantageously and without interference, FIG. 1 represents schematically a bridge casing 7 surmounting the unit 1.

Inside, the bridge casing 7 may support channel guides and electromechanical means in themselves known such as stepped electric motors and racks, and/or fluid dynamic means such as pneumatic, hydraulic or oil hydraulic cylinders, able to move the clamping bars 5 between a position above the frame 4 and a projecting position completely crossing the storage surface 2.

In addition, the control and guide means may draw the clamping bars 5 towards each other or apart, so as to clamp them onto said row 6 of box-shaped elements 3 and in particular onto the box-shaped element of the row 6 in a distal or furthest position from the frame 4.

In the case of reduced advancement of the clamping bars 5, that is to say as far as a position of incomplete crossing of the storage surface 2, another element 3 of the row 6 may be clamped.

For the reciprocal approach and distancing of the clamping bars 5 the control and guide means may for example comprise pneumatic, hydraulic or oil hydraulic cylinders, if necessary combined with levers and/or channel or tubular guides.

It is to be emphasised that the control and guide means of the clamping bars 5 may be structured and positioned according to a wide variety of technical solutions and in a manner immediately realisable by a technical mechanic.

For example, the bridge casing 7 may be omitted if said means are directly supported by the upper boards 4a of the frame 4 and project towards the clamping bars 5 in the way of articulated arms, so as to sustain and guide them, including by means of electric motors placed at the ends of the articulated arms and activated by means of toothed wheels on racks made on the clamping bars 5 or integral therewith.

The clamping bars 5 may each have at least one gripping member 8 suitable to engage a box-shaped element 3 or batter simultaneously a plurality of said box-shaped element 3 in a single row.

The gripping member 8 preferably consists of the end portion of each clamping bar 5 preferably provided with a rough surface with a high friction coefficient or the like suitable to laterally engage one or more box-shaped elements 3 of a row 6, or the end portions of the clamping bar 5 may also be free of any coating or lateral extension.

Further gripping members 8 may if necessary be provided for, such as suckers, elastic means or otherwise.

The gripping members 8 are not designed to engage a row 6 or elements of the row 6 with force or to lift them, but only to make the row 6 slide on the storage surface 2 and then onto a work surface 9.

In fact, the unit 1 comprises, on the frame 4 and under the clamping bars 5, a work surface 9 positionable—by means of movement of the unit 1—aligned and adjacent to the storage surface 2, so as to allow the clamping bars 5 to translate the box-shaped elements by sliding on said surface 9.

Originally, the work surface 9 engages only a portion of the unit 1 between the upper boards 4a and is movable thereon on the same plane to itself, to the unit 1 so as to separate by falling one or more box-shaped elements 3 positioned between the clamping bars 5.

In fact, it is provided that while the box-shaped elements 3 are on the work surface 9, they are kept still by the clamping bars 5 and/or preferably by stop or contrast means 10 for example made from a contrast piston aligned and consecutive with the box-shaped elements 3.

In this situation, the movement of the movable surface 9 does not cause a pushing of the box-shaped element 3 and the movable surface 9 can reverse away from the storage surface 2, so as to create an aperture 11 of variable dimensions into which one or more box-shaped elements 3 enter by dropping.

In the presence of a significant reversal of the movable surface 9 all the box-shaped elements 3 of a row 6 enter the aperture 11.

In detail, the work surface 9 is substantially rigid and slides between the upper boards 4a. Its movement is determined for example by dragging wheels acting by friction on the work surface 9 and operated by small electric motors supported by the upper bards 4a and preferably positioned above said boards 4a.

At the base of the unit 1 and under the movable work surface 9 is a delivery device 12 which extends preferably for the entire length of the transfer unit 1 and which is suitable to convey the box-shaped elements 3 separated by falling from the work surface 9, by the rearward movement thereof.

In detail, the delivery device 12 conveys the box-shaped elements 3 towards a delivery mouth 13 placed at the maximum distance from the storage surface 2. The delivery device 12 is for example a mobile conveyor belt and supported by the frame 4, or a tipping surface or the like. Preferably, side boards 14 are provided in the frame 4 so as to prevent lateral falling from the conveyor belt.

The contrast piston forming the stop or contrast means 10 is a three stage piston, and may assume a considerable extension in length so as to move the box-shaped elements 3 by sliding on the storage surface, in the storage step of the box-shaped elements 3 or the repositioning step of the box-shaped elements not selected in a collection operation.

Lastly, an electronic apparatus is provided for, in itself known, and common in the automated shelving sector, able to activate and correlate the various movements of said various members and elements provided for in the transfer unit 1.

The invention also discloses a new procedure for transferring box-shaped elements 3 and the like in a fast, automated manner towards and away from a storage surface 2.

It provides for a first step of storage or loading, having as a prerequisite, the programming of the electronic apparatus.

The electronic apparatus is able to memorise the type and dimensions of the products and can identify a suitable position on the storage surfaces.

In practice, the box-shaped elements 3 to be inserted are identified and catalogued, for example by scanning of the dedicated barcode or the like. In addition, the dimensions of the box-shaped elements are processed and the position thereof on said storage surfaces 2 is studied.

Subsequently the box-shaped elements 3 are inserted in the unit 1 which transports and deposits them on a storage surface 2.

Advantageously, the box-shaped elements 3 are positioned aligned in rows 6 alongside each other and having a main direction of extension 6a, and the rows are preferably formed of homogeneous elements, that is to say, identical articles of the same size. The rows 6 are preferably perpendicular to the direction of main extension of the storage surface 2.

If the dimensions are different, on account of an insufficient number of homogeneous articles to form a row 6 on the storage surface 2, the box-shaped element of the largest size 3a is preferably positioned distally in relation to the unit 1.

The deposit operation on the storage surface is performed by a combined action of the clamping bars 5—which draw together and advance maintaining the alignment of the elements 3—and of the contrast means 10, which push the box-shaped elements 3 from the work surface 9 to the storage surface 2.

After the storage or loading step or steps, an extraction or collection step or steps of the box-shaped elements 3 or the like is provided for.

In each extraction step, originally the collection and translation of an entire row 6 of box-shaped elements 3 simultaneously is provided for, or at least a substantial portion thereof, bringing said row onto a work surface 9.

The collection of only a substantial portion of the row 6 may comprise at least half the row, or at least three elements.

In a subsequent step, if not all the row 6 or substantial portion thereof is required by the user, a selection and separation of the elements carried on the work surface 9 is performed.

In other words on the work surface 9, if necessary one box-shaped element 3 or several box-shaped elements, if not the entire row 6—or portion thereof collected—which is to be sent to the user, is selected and separated.

All the box-shaped elements 3 of a row or only those selected and separated are then sent for delivery.

Lastly, any residual box-shaped elements 3 not selected and remaining on the work surface 9 are repositioned on the storage surface 2. Repositioning is performed by keeping the elements 3 aligned in said main direction of extension 6a. More specifically, the extraction or collection step is performed by mere forced sliding of the elements 3 from the storage surface 2 to the work surface 9.

The sliding is commanded by the clamping bars 5 which draw together and preferably engage the distal element 3a for example using the gripping member 8.

In addition, during the sliding the work surface 9 is kept at the level of the storage surface 2.

The selection and separation of the box-shaped elements 3 placed on the work surface is performed by falling by means of the formation of at least one partial aperture 11 in correspondence with the work surface 9.

Originally the partial aperture 11 is made by the reversal and shifting of the work surface 9, while the box-shaped elements are inserted between the clamping bars 5 and the contrast means 10.

The selected box-shaped elements are made to fall onto an underlying delivery device 12, where they are translated towards a delivery mouth 13, after the movement of the unit 1 to a delivery zone.

The cycle repeats itself with the loading of a plurality of box-shaped elements 3 arranged in rows on the work surface 9 and the translation thereof onto the storage surface 2, after the movement of the unit 1 to an optimal area for forming a row 6 of box-shaped elements 3 or the like.

The invention achieves the proposed objectives and permits important advantages.

In fact the transfer unit 1 and the procedure performed by it permit a rapid and accurate movement of the box-shaped elements when large quantities of the same exist.

In fact, in a situation where entire rows of identical box-shaped elements aligned on a work surface are possible, the unit 1 permits the movement of an entire row at a time or of a significant portion thereof. The storage and extraction operations are thus extremely fast.

They are then performed in a very simple manner by movements of the box-shaped elements which do not require lifting but only guided sliding and selection by falling.

In addition, the transfer unit 1 is also able to select and move a single box-shaped element when needed.

The invention claimed is:

1. A unit for automated transfer of box-shaped elements comprising at least one storage surface of a shelving system wherein said box-shaped elements are stored in several rows, said unit being configured to selectively transfer said box-shaped elements to alternately perform extraction and storage steps of said box-shaped elements, comprising:

clamping bars positioned alongside and distanced from each other so as to flank simultaneously a plurality of said box-shaped elements aligned with each other;

control and guide means configured to move said clamping bars to engage and translate said aligned box-shaped elements; and a work surface positioned under said clamping bars and positionable at the level of and consecutively with one said storage surface, said clamping bars being configured to translate by sliding said box-shaped elements onto said work surface and wherein said work surface is movable so as to separate by falling, one or more of said box-shaped elements positioned thereon, said clamping bars being rigid and each having at least one gripping member consisting of the end portion of each clamping bar provided with a surface having a high friction coefficient suitable to laterally engage one or more box-shaped elements, said work surface engaging only a portion of the unit between upper boards and being movable thereon on the same plane to itself, so as to create an aperture of variable dimensions into which one of more box-shaped elements enter by dropping.

2. The unit as claimed in claim 1, wherein under the movable work surface a delivery device is provided, configured to convey said box-shaped elements separated by falling from said work surface.

3. The unit as claimed in claim 1, wherein stop means of said box-shaped elements on said work surface are provided configured to permit an independent movement of said work surface.

4. The unit as claimed in claim 1, wherein said stop means are defined by at least one contrast piston aligned and consecutive to said row of box-shaped elements.

5. The unit as claimed in claim 1, wherein said contrast piston is configured to translate said box-shaped elements by pushing and sliding towards said storage surface.

6. The unit as claimed in claim 1, wherein said clamping bars have, at the end, at least one gripping member configured to engage a said box-shaped element.

* * * * *